United States Patent [19]

Goeke et al.

[11] 4,223,578
[45] Sep. 23, 1980

[54] APPARATUS AND METHOD FOR INTERNALLY PEELING PIPES

[75] Inventors: Alfons Goeke; Heinz Hartkopf; Eberhand Tückmantel, all of Solingen; Wilhelm Schweer, Leichlingen, all of Fed. Rep. of Germany

[73] Assignee: Th. Kieserling & Albrecht, Solingen, Fed. Rep. of Germany

[21] Appl. No.: 971,375

[22] Filed: Dec. 20, 1978

[30] Foreign Application Priority Data

Jan. 2, 1978 [DE] Fed. Rep. of Germany ....... 2800078

[51] Int. Cl.³ ................ B23B 3/00; B23B 35/00; B23B 39/00
[52] U.S. Cl. .................................. 82/1 C; 82/2 R; 408/1 R; 408/62; 408/88
[58] Field of Search ............... 82/1 C, 2 R; 408/1 R, 408/55, 62, 67, 70, 71, 88, 94, 97, 98, 99, 108, 114, 705

[56] References Cited

U.S. PATENT DOCUMENTS

| | | | |
|---|---|---|---|
| 2,014,679 | 9/1935 | Eckroate | 408/57 |
| 3,217,568 | 11/1965 | Graffenried | 408/705 |
| 3,522,826 | 8/1970 | Ervin et al. | 408/62 |
| 4,053,249 | 10/1977 | Ness et al. | 408/1 |

Primary Examiner—Harrison L. Hinson
Attorney, Agent, or Firm—Edward E. Sachs

[57] ABSTRACT

Elongated pipes are internally peeled by positioning a machining head within the pipe while providing relative rotational and longitudinal movement between the pipe and machining head. An external clamping force is applied to the pipe generally radially of its longitudinal axis and in substantial alignment with the machining head for minimizing vibration of the pipe during the machining operation.

16 Claims, 4 Drawing Figures

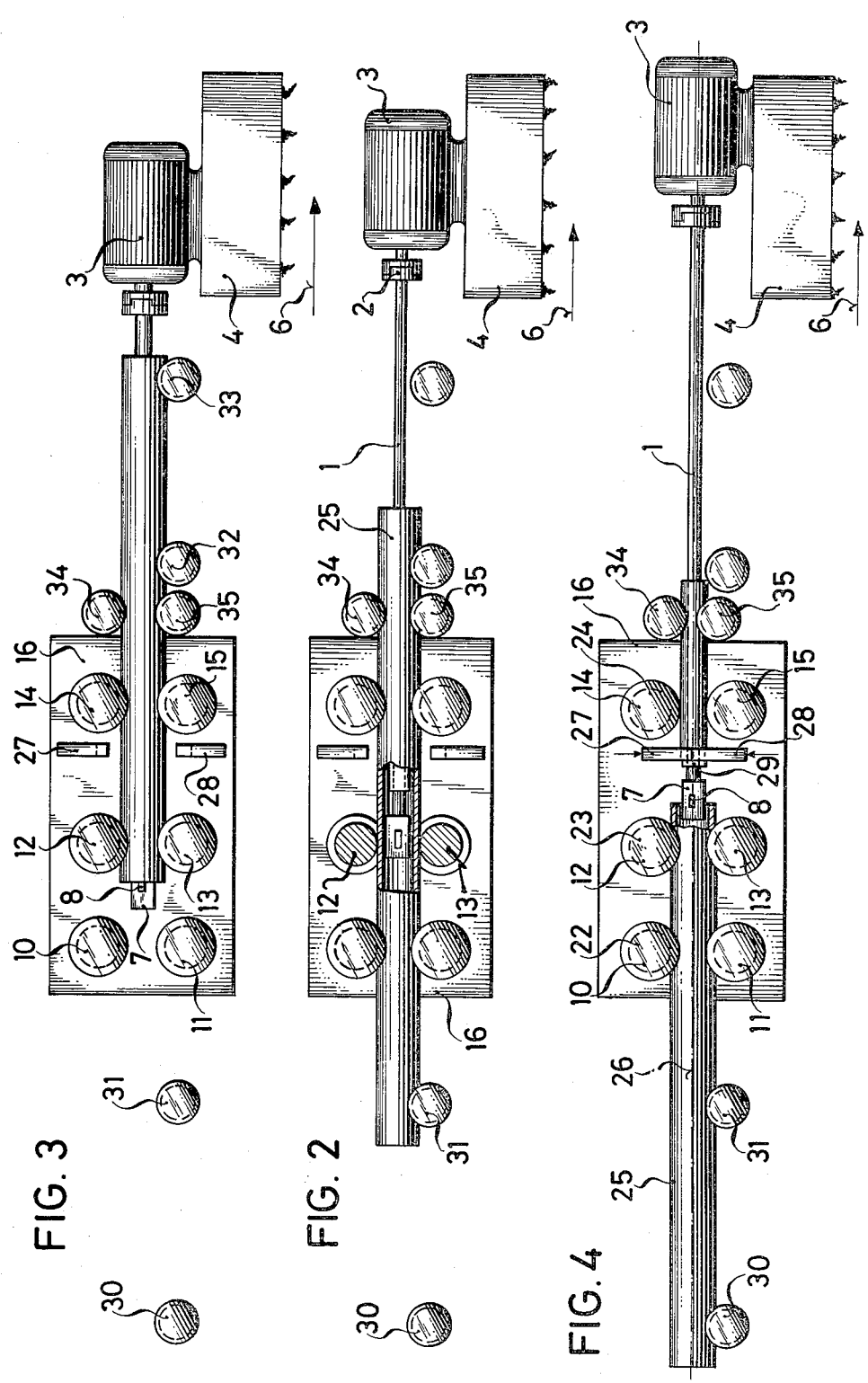

APPARATUS AND METHOD FOR INTERNALLY PEELING PIPES

The invention relates generally to apparatus and methods for machining metal and, more particularly, to an apparatus and method for internally peeling elongated pipes and the like.

It is known to internally peel elongated cylindrical pipes by pulling a machining head through the interior of the pipe. The machining head, or the drive rod on which it is mounted, is provided with support elements which engage the unmachined rough internal surface of the pipe. Due to the roughness and irregularities of the unmachined internal pipe surface, the machining head is not adequately stabilized, and the vibrations of the machining head and pipe in the cutting plane are not sufficiently damped. Peeling apparatus in which a machining head is pulled through a pipe is known in German Utility Model 76 22 259. This publication does not suggest how the machining head or pipe could be clamped to minimize vibrations.

It is therefore the primary object of the present invention to provide an improved apparatus and method for internally peeling pipes while minimizing vibrations.

It is an additional object of the invention to provide an improved apparatus and method for internally peeling elongated pipes while damping vibrations by applying an external clamping force to the pipe in substantial alignment with the machining head.

It is a further object of the invention to provide an improved apparatus and method for internally peeling elongated pipes while providing a clamping force on the pipe or machining head during the entire machining operation from the leading to the trailing end of the pipe.

An aspect of the invention resides in applying an external clamping force on the pipe in a localized longitudinal length of the pipe directly outwardly of the machining head. In other words, the cutting elements on the machining head may be considered to operate in a single plane extending perpendicular to the longitudinal axis of the pipe and the clamping force is applied externally of the pipe in the same plane. Vibrations produced by the machining operation are absorbed directly by the clamping means and then in turn by the machine frame.

In one arrangement, the machining head is rotatably driven and the pipe is longitudinally driven past the rotating machining head. The clamping means may comprise opposed rollers externally engaging the pipe outwardly of the machining head.

When the machining head is initially moving into the leading end of the pipe or exiting from the trailing end thereof, the rotating machining head can damage the clamping means or can be damaged itself. Therefore, in accordance with the present application, the pipe is clamped while the machining head is moved longitudinally into the leading end of the pipe until the machining head is in substantial alignment with the external clamping means. Longitudinal movement of the machining head is then stopped while the pipe is longitudinally driven therepast. When the trailing end of the pipe approaches the machining head, a sleeve rotatably positioned on the machining head drive rod is exposed and is clamped to firmly hold the machining head against vibration when it exits from the trailing end of the pipe.

The pipe is preferably clamped by a plurality of opposed pairs of rollers positioned in longitudinally-spaced relationship. This insures that the pipe will be clamped in at least two longitudinally-spaced locations in the immediate vicinity of the machining head for preventing any tilting of the pipe.

The opposed pairs of clamping rollers are preferably profiled for closely engaging the pipe to provide support for the pipe in all transverse directions.

For a better understanding of the present invention, together with other and further objects thereof, reference is had to the following description taken in connection with the accompanying drawings, and its scope will be pointed out in the appended claims.

In the drawing:

FIG. 2 is a side elevational view showing a machining head positioned within a pipe, and with portions cut-away from clarity of illustration;

FIG. 3 is a view similar to FIG. 2 and showing the machining head in its position immediately prior to a peeling operation on a pipe; and FIG. 4 is a view similar to FIG. 2 and showing the machining head when it is about to exit from the trailing end of a pipe.

Figure 1:
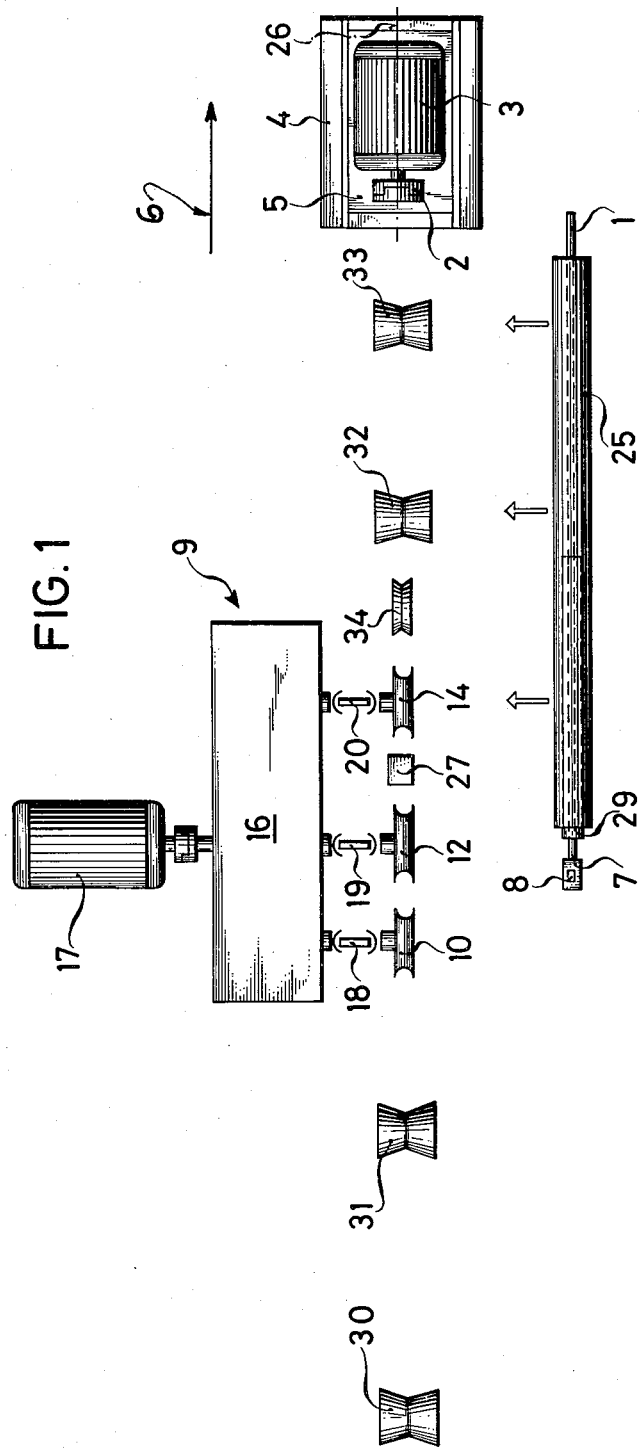
FIG. 1 is a diagrammatic plan view of a peeling apparatus constructed in accordance with the present application.

FIG. 1 shows a peeling apparatus including an elongated machining head drive rod 1 releasably connectable at one end by a releasable coupling 2 to a drive motor 3 for rotatably driving the rod 1 and machining head 7. The base of the motor 3 is attached to a plate 5 which is displaceable back and forth relative to the support foundation 4 in the direction indicated by arrow 6. That is, the motor 3 is longitudinally movable back and forth parallel to longitudinal axis 26 of the pipe 25 which also corresponds to the longitudinal axis of rotation for the machining head drive rod 1.

Remote from the releasable coupling 2, the machining head drive rod 1 has a machining head 7 mounted thereon. The machining head 7 is a known peeling head having one or more cutters 8 circumferentially-spaced uniformly around its periphery.

Pipe clamping and drive means is generally indicated by numeral 9 in FIG. 1 and, as best shown in FIGS. 2-4, includes three opposed pairs of longitudinally-spaced clamping and pipe driving rollers 10 and 11, 12 and 13, and 14 and 15. The rollers 10-15 are rotatably driven by gearing 16 and motor 17 of FIG. 1. The rollers 10-15 are drivingly connected with the gearing 16 by cardan shafts 18, 19 and 20 in FIG. 1.

The rollers 10-15 are peripherally profiled to closely fit the size and shape of the cylindrical pipe for supporting same in all directions transverse to the pipe longitudinal axis. The axes of rotation of the rollers 10-15 are positioned perpendicular to the longitudinal axis 26 of the pipe 25. Axes of rotation for the rollers 10, 12 and 14 are generally indicated by numerals 22, 23 and 24.

Pipe drive rollers 30, 31, 32 and 33 are located on opposite ends of the pipe clamping and driving means 9 for guiding and supporting the pipe before and after internal peeling of same.

Intermediate the first pair of clamping and drive rollers 14, 15 and the second pair of rollers 12, 13 are a pair of opposed generally V-shaped clamping elements 27, 28 which move toward and away from the longitudinal axis 26. When the machining head 7 approaches the trailing end of the pipe 25, the clamping elements 27, 28 move inwardly toward the longitudinal axis 26 for clamping against a sleeve 29 through which the machining head drive rod 1 is rotatably supported. This holds the machining head drive rod 1 and the machining head 7 against vibration and prevents same from striking other parts of the apparatus. As an alternative to the clamping elements 27, 28, or in addition thereto, an opposed pair of profiled rollers 34, 35 may be provided immediately before rollers 14, 15. When the sleeve 29 is used as a support in the manner described, the rollers 34, 35 would not be rotatably driven.

In operation of the apparatus, the machining head drive rod is extended through a pipe 25 until the machining head 7 is adjacent the leading end of the pipe as generally indicated in FIG. 1. The combined pipe and drive rod assembly are then moved perpendicular to their length as generally indicated by the arrows above the pipe 25 in FIG. 1 for positioning the pipe on the lower rollers. Obviously, the upper rollers 10, 12,14 and 34 are upwardly movable for allowing positioning of the pipe therebetween. The leading end of the pipe 25, with the machining head 7 projecting outwardly thereof, is positioned between the first and second opposed pairs of clamping and pipe drive rollers 14, 15 and 12, 13. The machining head 7 projects outwardly of the leading end of the pipe as shown in FIG. 3 so the machining head 7 is located in spaced relationship to the rollers 12, 13. The motor 3 is then turned on for rotatably driving the machining head 7 through the drive rod 1. The motor 17 is also turned on for driving the rollers 10-15 in a direction for feeding the pipe 25 from right to left in FIGS. 2-4. At approximately the same time, or when the cutters 8 begin acting on the pipe 25, the motor 3 is shifted to the right in the figures in the direction of arrow 6. This shifting movement of the motor 3 also pulls on the machining head drive rod 1 for moving the machining head 7 to the right in the figures until the machining head 7 is located precisely in alignment with the rollers 12, 13. This position of the machining head 7 is indicated in FIG. 2 with the machining head 7 and its cutters 8 located between the rollers 12, 13. The pipe 25 continues to the longitudinally driven by the rollers 10-15 from right to left in FIGS. 2-4 until the trailing end of the pipe 25 approaches the machining head 7. At that time, the motor 3 is again moved to the right in the direction of the arrow 6 for moving the machining head 7 out from between the rollers 12, 13 toward the first pair of rollers 14, 15. During this longitudinal movement of the machining head 7, the drive rollers 10-15 continue operating for longitudinally driving the pipe from right to left. As soon as the trailing end of the pipe 25 leaves the first pair of rollers 14, 15 and is far enough toward the rollers 12, 13, the sleeve 29 on the drive rod 1 is exposed. The clamping elements 27, 28 then move inwardly toward the longitudinal axis 26 for clamping the sleeve 29 which is also engaged between the rollers 34, 35 which may be biased toward the axis 26. This supports the drive rod 1 and the machining head 7 as the trailing end of the pipe moves past the machining head 7 and through the rollers 12, 13. The internally peeled pipe is then removed from the apparatus along with the drive rod 1 and the machining head 7. A new assembly of a pipe, drive rod and machining head is then inserted into the apparatus as previously described.

In the arrangements shown and described, the motor 3 and the rollers 10-15 comprise the drive means for providing relative rotational and longitudinal movement between the peeling head 7 and the pipe 25 during internal peeling of the pipe. This drive means specifically provides rotational drive of the machining head 7 and longitudinal drive of the pipe 25. The pipe clamping means for providing a clamping force externally of the pipe 25 acting generally radially toward the pipe longitudinal axis in substantial alignment with the machining head 7 is defined by the pipe clamping and driving rollers 12, 13. The rollers 12, 13 preferably engage the exterior of the pipe 25 in the cutting plane defined by the cutting edges of the cutters 8. Longitudinal shifting of the machining head 7 by movement of the motor 3 on its foundation 4 enables firm support of the pipe as peeling takes place adjacent both the leading and trailing ends of the pipe. The sleeve clamping means for clamping the sleeve 29 is defined by either or both of elements 27, 28 and 34, 35.

While there has been described what is at present considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

We claim:

1. Apparatus for internally machining elongated pipes and the like comprising: a machining head for internally machining a pipe or the like, drive means for providing relative rotational and longitudinal movement between the pipe and said machining head, and pipe clamping means positioned in cooperative relationship with said machining head generally radially outwardly thereof and in substantial alignment therewith for providing an external clamping force on the pipe generally radially inwardly of its longitudinal axis in substantial alignment with said machining head and for maintaining said cooperative relationship and said clamping force during relative rotational and longitudinal movement between the pipe and machining head to inhibit vibration of the pipe during machining thereof.

2. The apparatus of claim 1 wherein said drive means provides rotational movement of said machining head with respect to said pipe and provides longitudinal movement of said pipe with respect to said machining head.

3. The apparatus of claim 1 wherein the pipe has leading and trailing ends and said machining head is mounted on an elongated rod, and rod clamping means for clamping said rod adjacent said machining head when said machining head is adjacent said trailing end.

4. Apparatus for machining elongated pipes and the like comprising: a machining head for internally machining a pipe or the like, machining head drive means for rotatably driving said machining head, pipe drive means for longitudinally driving a pipe along said machining head from a leading pipe end toward a trailing pipe end, and pipe clamping means positioned in cooperative relationship with said machining head generally radially outwardly thereof and in substantial alignment therewith for providing an external clamping force on the pipe generally radially inwardly of its longitudinal axis in substantial alignment with said machining head and for maintaining said cooperative relationship and said clamping force as the pipe is longitudinally driven past said machining head and clamping means to inhibit vibration of the pipe during machining thereof.

5. The apparatus of claim 4 including machining head shifting means for longitudinally shifting said machining head relative to the pipe for substantially aligning said machining head with said clamping means.

6. The apparatus of claim 5 wherein said shifting means is operative for longitudinally shifting said machining head relative to the pipe during final machining of the pipe to the trailing end thereof.

7. The apparatus of claim 4 wherein said machine head drive means is longitudinally shiftable for internally machining the pipe adjacent the leading and trailing ends thereof.

8. The apparatus of claim 7 wherein said machining head drive means includes an elongated drive rod, a sleeve positioned on said drive rod adjacent said machining head, said rod being rotatably supported in said sleeve, and sleeve clamping means for clamping said sleeve to hold said machining head against transverse movement while machining the pipe adjacent its trailing end.

9. The apparatus of claim 4 wherein said clamping means comprises a plurality of opposed pairs of longitudinally-spaced rollers.

10. A method of internally machining an elongated pipe or the like comprising the steps of: positioning a machining head within a pipe, rotatably and longitudinally moving the pipe and machining head relative to one another for internally machining the pipe in a direction from its leading end toward its trailing end, applying an external clamping force on the pipe generally radially inwardly of its longitudinal axis in substantial alignment with the machining head for minimizing vibration of the pipe, and maintaining said clamping force in substantial alignment with said machining head during said step of rotatably and longitudinally moving the pipe and machining head relative to one another.

11. The method of claim 10 wherein said clamping force is applied by clamping means and including the steps of longitudinally moving the machining head into alignment with the clamping means during initial machining of the pipe inwardly from the leading end thereof, and longitudinally moving the machining head past the clamping means during final machining of the pipe adjacent the trailing end thereof.

12. The method of claim 11 including the step of supporting said machining head against vibration during final machining of the pipe adjacent its trailing end.

13. A method of internally machining elongated pipe or the like comprising the steps of: positioning a machining head within a pipe, rotatably driving the machining head while longitudinally driving the pipe therepast in a direction from a leading pipe end toward a trailing pipe end, providing an external clamping force on the pipe generally radially inwardly of its longitudinal axis and in substantial alignment with the machining head, and maintaining said clamping force in substantial alignment with said machining head during said step of rotatably driving the machining head while longitudinally driving the pipe therepast.

14. The method of claim 13 including the step of longitudinally moving the machining head relative to the pipe in a direction from the leading toward the trailing pipe end for initially positioning the machining head within the pipe.

15. The method of claim 14 including the step of longitudinally moving the machining head relative to the pipe in a direction from the leading toward the trailing pipe end for final machining of the pipe adjacent its trailing end.

16. The method of claim 15 including the step of supporting the machining head against transverse vibration during final machining of the pipe adjacent its trailing end.

* * * * *